United States Patent
Roesel, Jr. et al.

[11] Patent Number: 5,990,590
[45] Date of Patent: *Nov. 23, 1999

[54] VERSATILE AC DYNAMO-ELECTRIC MACHINE

[75] Inventors: John F. Roesel, Jr.; Ronnie J. Barber, both of Bradenton, Fla.

[73] Assignee: Precise Power Corporation, Bradenton, Fla.

[ * ] Notice: This patent is subject to a terminal disclaimer.

[21] Appl. No.: 09/094,849

[22] Filed: Jun. 15, 1998

Related U.S. Application Data

[63] Continuation of application No. 08/648,120, Sep. 10, 1996, Pat. No. 5,838,085.

[51] Int. Cl.⁶ .................................................. H02K 16/00
[52] U.S. Cl. ........................... 310/113; 310/112; 310/114
[58] Field of Search ................................... 310/112, 113, 310/114, 115, 118, 122, 126

[56] References Cited

U.S. PATENT DOCUMENTS

| | | | |
|---|---|---|---|
| 2,113,102 | 4/1938 | Whittle | 310/113 |
| 3,050,635 | 8/1962 | Tanner | 307/64 |
| 3,931,535 | 1/1976 | Roesel, Jr. | 310/113 |
| 4,168,459 | 9/1979 | Roesel, Jr. | 310/112 |
| 4,177,414 | 12/1979 | Roesel, Jr. et al. | 307/78 |
| 4,227,136 | 10/1980 | Roesel, Jr. | 318/701 |
| 4,406,950 | 9/1983 | Roesel, Jr. | 290/4 C |
| 4,412,170 | 10/1983 | Roesel, Jr. | 307/64 |
| 4,447,737 | 5/1984 | Cronin | 310/114 |
| 4,466,536 | 8/1984 | Zeitel | 206/273 |
| 4,600,873 | 7/1986 | Roesel, Jr. et al. | 310/163 |
| 4,663,536 | 5/1987 | Roesel, Jr. et al. | 318/705 |
| 4,827,152 | 5/1989 | Farkas | 307/68 |
| 5,068,587 | 11/1991 | Nakamura et al. | 318/771 |
| 5,254,894 | 10/1993 | Satake et al. | 310/114 |
| 5,281,879 | 1/1994 | Satake et al. | 310/114 |
| 5,311,062 | 5/1994 | Farkas | 310/116 |

FOREIGN PATENT DOCUMENTS

| | | |
|---|---|---|
| 421655 | 4/1991 | European Pat. Off. . |
| 607426 | 12/1978 | Switzerland . |
| 994108 | 6/1965 | United Kingdom . |

*Primary Examiner*—Clayton LaBalle
*Attorney, Agent, or Firm*—Quarles & Brady LLP

[57] ABSTRACT

The Invention comprises a versatile AC dynamo-electric machine comprising isolated dual stators, each both concentrated windings energizable with single-phase AC, and main windings and a single high inertia sleeve and drive place connected to a rotor shaft. The sleeve contains independent electrical rotors, one for each stator. Each rotor has an innermost layer of magnetizable permanent magnetic material in which the concentrated coils in the stator produce a desired pattern of magnetic poles reacting with the rotating field of the main windings. The machine can function as a synchronous AC motor, or a constant frequency output dual AC generator or as an AC motor-generator with long ride-through time. A UPS system comprises the machine in the motor-generator mode, with clutch means to connect an engine to the rotor shaft to start the engine.

30 Claims, 7 Drawing Sheets

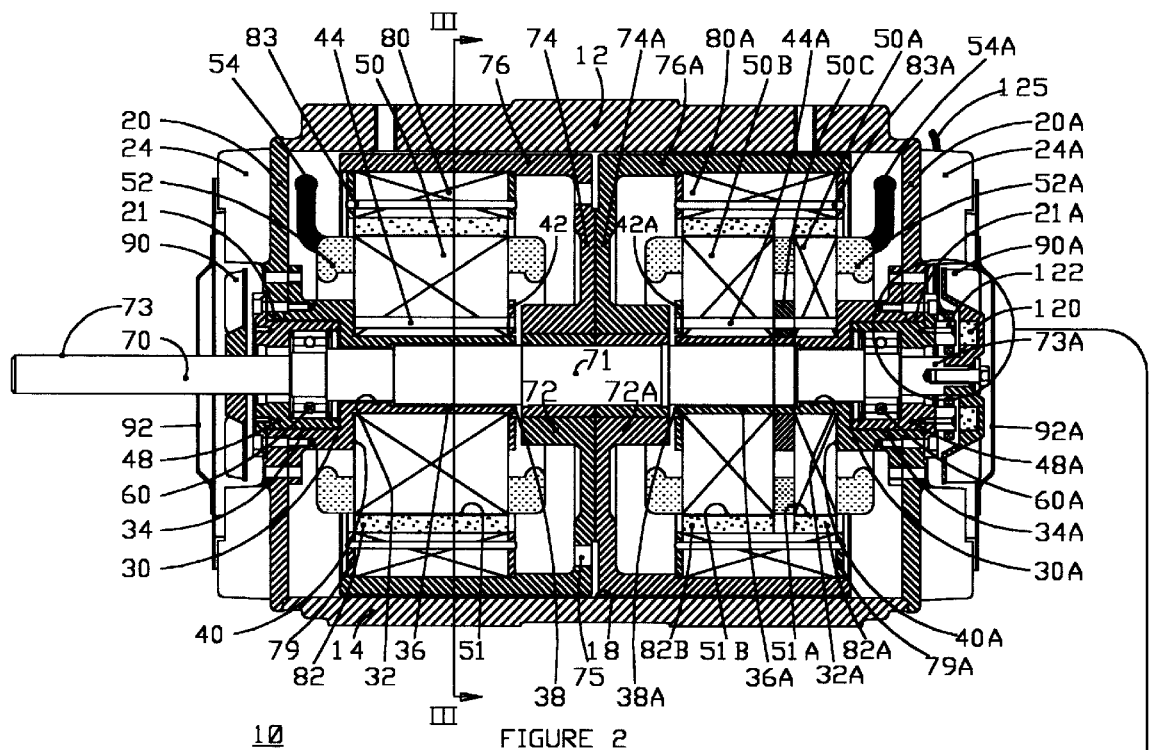
FIGURE 2
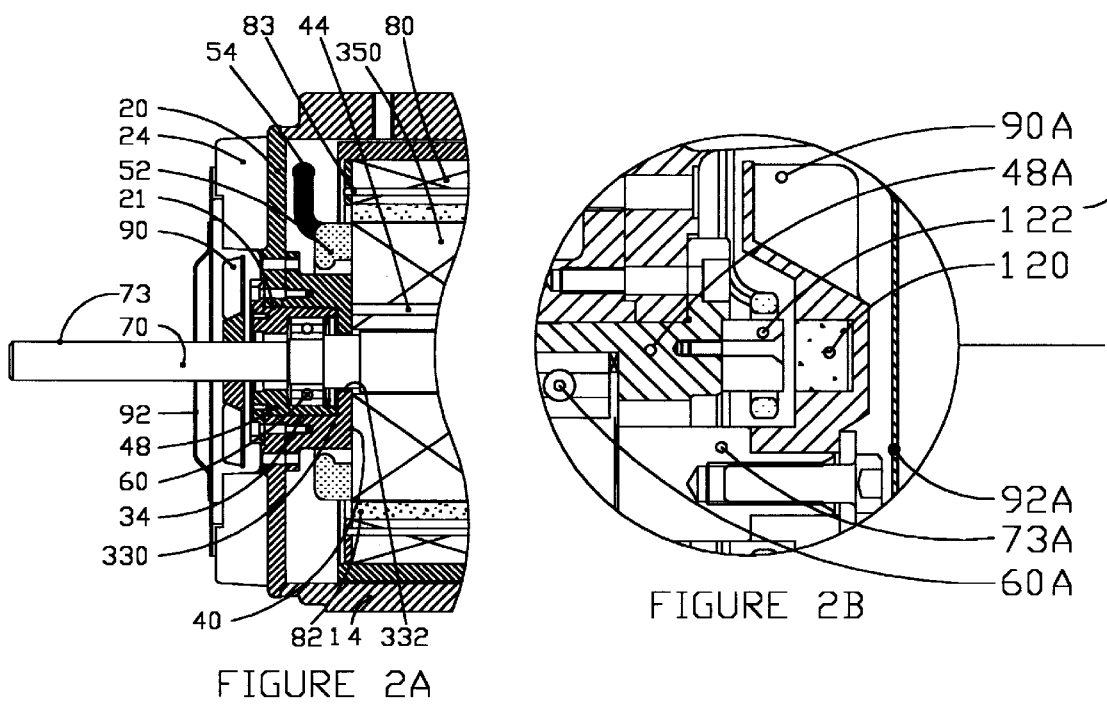
FIGURE 2A
FIGURE 2B

2 POLE 60 HZ 40 H.P. UNIT
MOTOR OF INVENTION
LOAD RIDE THROUGH TIME AFTER INPUT POWER LOSS

CONVENTIONAL SINGLE PHASE INDUCTION MOTOR PERFORMANCE VS.
40 H.P. SINGLE-PHASE MOTOR OF INVENTION

HIGH TORQUE STARTING CONNECTION
12B

NORMAL RUN P.F. CONTROL CONNECTION
12C

VERSATILE AC DYNAMO-ELECTRIC MACHINE

This is a Continuation of application Ser. No. 08/648,120, filed Sep. 10, 1996 now U.S. Pat. No. 5,838,085.

BACKGROUND

Need for Uninterruptible Power Supply (UPS)

Scientific, commercial, medical, governmental military, communications and industrial activities, as well as offices, businesses, schools and homes, need electrical power to carry out many of their functions. A sudden interruption or failure, even of brief duration, of electrical power is not only inconvenient, but may be damaging and costly to any of these activities. Computer data may be lost, work in progress damaged, or lives may be put in jeopardy. Sometimes it takes many days of time and work effort to restore manufacturing operations and to recover from the damage and losses so incurred from electrical power failures.

Many of these facilities and activities have gas or diesel engine generators or other standby electrical power equipment that require several seconds to activate and put into service to replace the suddenly unavailable electrical power. The several second lapse of time while an engine is being started and when no electrical power is available can cause serious disruption or even damage or loss to such facilities.

Reliability of Electrical Power Supply

While utilities supplying electrical power are usually quite reliable, circumstances beyond their control may occur from time to time that interrupt or cause the electrical power supply to be inadequate or unusable. Accidents and equipment failure in the power plants, or lighting strikes and other incidents affecting the power lines, transformers and other equipment, may cut off electrical power in areas ranging in extent from whole cities, down to only a single power line into a factory, home or an office. As a result, the electrical power user often is suddenly, and usually unexpectedly, rendered helpless.

Electric utilities inform their customers that they cannot guarantee clean uninterrupted electrical power being delivered at all times to a customer. Studies of the types of electrical interruptions and disturbances in a number of U.S. and Canadian utilities show that, during a long period of time such as a year, the frequency and duration of various kinds of interruptions averages out to a general pattern as shown in FIG. 1 of the drawings. It will be noted from the bar chart in FIG. 1 that about 45% of the interruptions in these 60 Hertz systems last less than 10 cycles, that is less than a sixth of a second, which period is far more time than that required to "crash" a computer. Another 23% of the interruptions last less than a second, while 18% of the interruptions last from 1 to 10 seconds. Thus, a total of some 86% of the AC power interruptions do not last beyond 10 seconds. However, the final 14% of the power interruptions that last more than 10 seconds also create major problems for many electrical power users and may result in the most costly damage. In addition, on any local power line, power factor correction capacitors and other switching on the utility system, together with customer motor starting, load switching and electrically "dirty loads", such as arc melting furnaces, electronic motor drives, battery chargers and the like, create an almost constant chorus of voltage spikes, sags and electrical noise on the power lines which may result in problems for many users. Another source of problems occur during weather extremes in some areas, such as either a very cold snap in the southeast U.S. or a heat wave in summer in the mid-west, when so much electrical power demand is created that the utility peak power generating capacity can be exceeded. When this happens, the utility may have to resort to "rolling" blackouts lasting 15 minutes or so in duration by interrupting all electrical power to successive portions of their utility service area in order to prevent total system collapse. These "blackouts" may be repeated every 2–3 hours in each section of the utility's service areas until the crisis is over.

To avoid some of these electric power quality problems, reliance is placed by the electrical user on auxiliary power protection devices and/or power supplies which are interposed between the utility line and the electrical equipment to keep it functioning when the outside electrical power supply is unacceptable or is interrupted. In many cases these auxiliary power supplies utilize electronic semiconductors in the power path to convert and control the auxiliary electrical power. These last components are sometimes subject to failure from high voltage spikes in the incoming AC power lines, and the resulting failure may also cause damage to the load being protected. In many UPS units, storage batteries are relied upon to supply electrical power to equipment when the outside AC power is interrupted. These battery systems are often rated for a 5 to 15 minute operation with a several hour subsequent battery recharge often being needed before they are available when another outside power outage occurs. This last need renders this type of system almost useless in any "rolling" blackout or a long term outage situation. Further, the proper installation of storage batteries usually requires that a separate room be used to provide isolated ventilation to prevent the accumulation of acid fumes and hydrogen gases. Serious fires and explosions have occurred when a failure in a battery (often due to poor maintenance or installation) takes place in a group of lead-acid batteries. In a recent situation, in a major city in the United States, a spontaneous explosion took place in a room having a large stack of lead-acid batteries used to power city wide communications and related services. In this case, the entire safety system of the city failed to function for over seven hours and in that period there were no normally available fire, police or medical emergency communications. It also took much effort and expense to clean up the acid spill. Further, storage batteries require regular maintenance and recharging. Depending on the design and usage, the life of a lead-acid battery system may be relatively short so that they may require replacement every few years. Storage batteries are quite temperature sensitive and deteriorate rapidly if their temperature rises above about 25° C. (77° F.). In addition, the disposal of storage batteries constitutes a serious ecology problem. Diesel engines and other engines connected to drive auxiliary electrical generators are often used as standby emergency units when outside utility power is interrupted, and they ordinarily require a storage battery to start the engines. Thus, they are critically dependent on a battery to function when so needed. Failure of the cranking battery is one of the main reasons for failure to start in these engine-generator sets. Consequently the batteries require regular care and maintenance at all times. Battery chargers are a major source of electrical "noise" in the electrical utility system. Accordingly it would be desirable to eliminate the use of or reliance on any storage batteries and to provide a UPS system with controlled frequency, phase and voltage output, with no electronic semiconductors in the power path, that provides power to the load for at least 10 seconds with a high inertia low windage loss rotor, superior isolation from high voltage spikes on the power line, the ability to directly couple to an external engine or other prime mover for long term continuous protection and to provide a desirable load for the electric utility.

PRIOR ART

This invention is an improvement over the inventions in our U.S. Pat. Nos. 4,663,536, issued May 5, 1987, 4,600,873 issued Jul. 15, 1986, 4,177,414 issued Dec. 4, 1979, and 3,931,535 issued Jan. 6, 1976.

The motor-generator structures shown and described in U.S. Pat. No. 4,663,536 have two high windage loss rotor end plates and no shaft extending to the exterior of the casings enclosing their common motor and generator devices. Therefore no external engine can be connected in a practical manner thereto to drive the generators when power from the outside AC source is interrupted. In using this motor-generator, a separate standby engine and electrical generator must be started to supply AC to drive the motor thereof to generate AC when an outside power failure occurs.

In U.S. Pat. No. 4,600,873 there is disclosed only a single stator and rotor motor unit and no conversion to, or its use as an electrical generator is disclosed.

U.S. Pat. No. 3,931,535 discloses a joint AC motor-generator unit where the induction motor rotates only the generator rotor so as to generate AC. Only FIG. 5 shows a rotating shaft driven by the inside motor rotor while the stators are located about the peripheries of the induction motor and generator rotor elements. There is no teaching of the high rotational inertia design, synchronous operation and other features of the present inventions.

U.S. Pat. No. 4,177,414 in which the present two inventors were the patentees, discloses employing a master AC generator and a second separate or slave AC generator, and an AC circuit to energize an excitation coil in the second generator with single-phase AC of a phase to produce a desired voltage from the two AC generators when connected in series. Means for shifting the phases of the single-phase AC are disclosed. Otherwise, the invention devices and the circuits therein are not anticipatory of the present invention.

In summary, none of these prior art patents teaches or discloses any of the critical features of the present invention.

SUMMARY OF THE INVENTION

This invention comprises a unique versatile dynamo-electric machine having two stators each functioning with an electrical rotor, to enable the user to selectively operate it as a dual AC motor, or a dual AC generator, or an AC motor-generator, which machine comprises a casing or an enclosure within which are:

a) two separate electrical stators, each having main windings and at least one stator having at least one concentrated or exciter windings, and b) a common rotor structure having a high rotational inertia sharing a common single drive plate, with two physically coupled and closely spaced, but separately operable electrical rotors, each rotor surrounding one of the stators, the rotors each comprising a high permeability, low loss core carrying a surface layer of magnetizable permanent magnetic material, which layer passes closely to the stator so that single-phase AC passing through the concentrated windings thereof will magnetize the adjacent magnetic layer into a written-pole pattern of north and south magnetic poles, and the magnetic poles so provided will react with the main windings in the stator to produce, when the stator-rotor is used as an AC generator, AC power of a desired voltage, frequency and phase for a load or when the stator-rotor is used as an AC motor to produce the desired torque characteristics. The machine has an external shaft from the rotor extending outside the enclosure or casing which can either drive a physical load, or can be driven by an engine or other prime mover.

Each stator and its associated electrical component rotor can function as either an AC motor or as an AC generator. When employed as an AC motor, the machine can start with very low current and can accelerate a very large inertial load without overheating. Thus the dynamo-electric machine can have both pairs of stator-rotor units function as (1) a common motor by simply passing AC to the main windings of each stator, with single-phase AC of the same frequency as the AC to the main windings being supplied to the concentrated windings of both stators, as (2) an AC generator by revolving the rotor and passing to the concentrated windings single-phase AC of the desired frequency desired for the AC power output load from both units, (3) and finally, the dynamo-electric machine can operate as a motor-generator with either stator-rotor pair of the machine functioning as the driving motor when AC of any desired frequency is supplied to its main windings, and single-phase AC of the same frequency is supplied to its concentrated winding and the other stator-rotor pair functioning as an AC generator with single-phase AC of the frequency desired for a load being supplied to its concentrated winding. The dynamo-electric machine can operate at synchronous speed with outside AC power supplied to it when it is functioning in the motor mode at one or both stator-rotor pairs. It has been found that the machine has an extremely high efficiency both because of its synchronous speed and its compact single rotor drive plate, and a close clearance construction resulting in low windage losses. Due to the high rotational inertia of the rotor, the machine has a prolonged ride-through time when there is an interruption of outside AC power to one or both pairs of stators and rotors when operating as a motor. The AC power output of any or both stator-rotor pairs operating as a generator can be held to a constant desired frequency and voltage even when the rotor speed changes, such as following an AC power interruption thereto, as long as its speed is about 80% or greater of synchronous speed.

Unique UPS systems can be provided by using as a critical component thereof, the dynamo-electric machine of this invention in the motor-generator mode, that is, one stator-rotor pair functioning as a motor and the other stator-rotor pair as an AC generator. No batteries are required to maintain, to start, or operate the dynamo-electric machine. An engine or other prime mover can be directly engaged through a clutch to the shaft of the dynamo-electric machine for rapid engine starting, and thereafter utilizing the engine to continue to keep the dynamo-electric machine operating, thereby to supply AC from the generator to the load when outside AC power to the motor thereof is interrupted.

Due primarily to its very low starting current and high efficiency at full running speed, the dynamo-electric machine of this invention has been found to be exceptionally useful when it is supplied single-phase AC and it is operating as a single-phase AC motor. At the present time, single-phase electric AC motors are commercially available and used only in small ratings, not exceeding about 10 to 12 horsepower (7½ to 9 kW). At the higher ratings the larger commercial single-phase motors are considered unreliable and are relatively inefficient, and utilities object to their use because of their grossly excessive starting current demand. The inventors have tested single-phase motors of up to 40 horsepower using the dual stator-rotor construction herein disclosed and found them to start with low inrush current, easily accelerate a very high inertial load without overheating, readily reach synchronous speed and operate properly, with high electrical efficiency, exceeding that of any known prior art single-phase AC motors.

DESCRIPTION OF DRAWINGS

FIG. 2 is a longitudinal cross-section in a vertical plane of a versatile dynamo-electric machine of the present invention.

FIG. 2A is a partial cross-section in a vertical plane of a modification of the machine shown in FIG. 2.

FIG. 2B is an enlarged portion of FIG. 2 as shown.

DETAILED DESCRIPTION OF THE INVENTION

Figure 3:
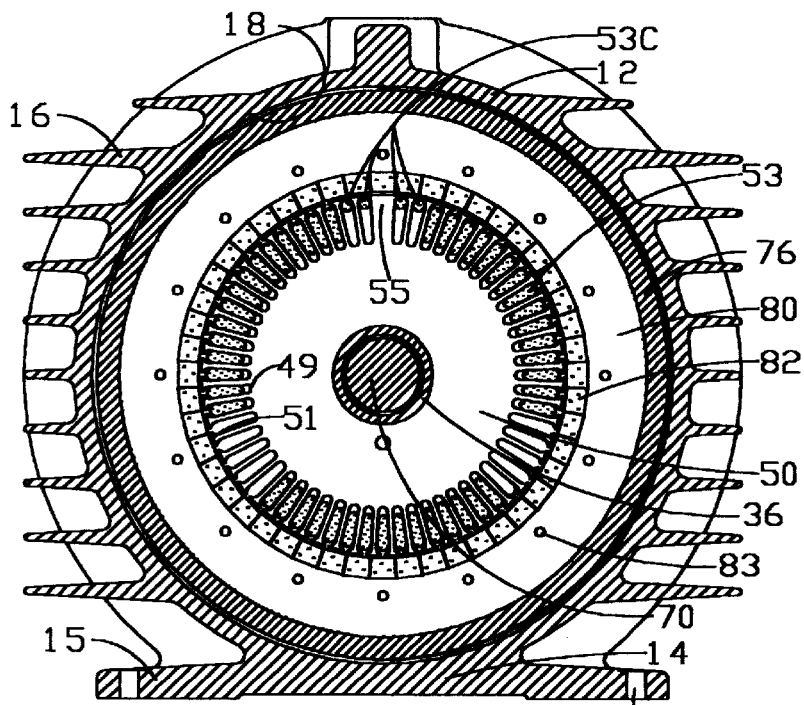
FIG. 3 is a transverse vertical cross-section along line III of FIG. 2.

Referring to the drawing, there is shown in FIG. 2 a vertical cross section along a horizontal axis, of a dynamo-electric machine 10 of the present invention, and FIG. 3 is a vertical cross section along line III—III of FIG. 2. The dynamo-electric machine 10 comprises an open-ended outer casing 12 having an integral base 14 provided with feet or lugs 15, as best seen in FIG. 3, having holes or slots 15A through which bolts or other fastening means may be applied to fasten the machine down upon a support when in use. The casing 12 may be a single steel or aluminum casting, or may be fabricated from separate castings or components, welded and/or bolted together. The exterior of the casing 12 may be provided with integrally cast cooling fins 16. A smooth surfaced circular cylindrical bore 18 extends from one end to the other of the casting along a longitudinal horizontal axis thereof. End bells 20 and 20A are removably affixed, as by machine screws, to each open end of the casing to form a tight enclosure therewith. Cooling fins 24 and 24A are desirably provided on each of the end bell's exterior surfaces.

Each end bell 20 and 20A has a large central aperture 21 and 21A, respectively, and at the interior surfaces of each of the end bells adjacent to these central apertures, there are affixed, as by machine screws for example, heavy based stator support spindles 30 and 30A, respectively. It is desirable that the contacting surfaces of the end bells and the spindles where they meet be smooth and conform to each other so that heat generated in the stator placed on each spindle may readily flow from the spindles to the end bells. Each stator support spindle 30 and 30A, has a longitudinal hollow circular bore 36 and 36A, respectively, extending entirely through it, and such bore desirably progresses from a large diameter at its outer or aperture attachment end at 34 and 34A, to a smallest diameter section 32 and 32A, which terminates at a spindle inner end 38 and 38A, respectively. The spindle inner ends 38 and 38A are coaxial with each other and are spaced apart a substantial distance to provide a space, for a reason to be brought out subsequently.

Upon the outside of each of the spindles are placed stators comprising a single core 50 on the left spindle; and separate cores 50A and 50B on the right spindle, with a spacer 50C disposed between them, each core being of a low coercive force, low loss magnetic material, such as laminations of silicon steel, joined into a stack and having an outer circular cylindrical surface 51, 51A and 51B. The axial length of core 50B is preferably significantly longer than that of core 50A. Each stator core has an inner bore as small as the outer diameter of spindle 30 at spindle inner end 38, and 30A at inner end 38A so that each core will fit tightly thereon when slipped over the end and on to the body of spindle. In assembly, the core 50 is pushed over the spindle end 38 and abutted against a shoulder 40 on the spindle. A retaining washer 42 having a central hole just fitting over the spindle end 38 is applied firmly against the end of the stator core 50 and when so positioned the washer may be welded or otherwise fastened fixedly to the spindle end 38. An insulated rod 44 may be fitted into a hole in the washer 42 aligned with a hole in core 50 and locked in place, as by an adhesive, to keep the core laminations from turning. The right hand stator cores 50A and 50B are similarly fitted over and rigidly joined to their spindle 30A. As best seen in FIG. 3, the stators 50, 50A, and 50B have longitudinal slots 49 in their respective circular cylindrical outer surfaces 51, 51A, and 51B, and in most of these slots are placed main windings 53, and having at least one concentrated winding 53C with each side of the concentrated winding placed in one to three adjacent slots 49 separated by a relatively narrow pole 55 in each of the stators. The slots 49 are arranged generally parallel to the axis of the core 50, but may be skewed. Cores 50A and 50B are spaced apart by the spacer 50C to allow each core to contain separate individual concentrated windings with their end turns being located the space provided at spacer 50C, but with the main windings passing through matching slots of both cores 50A and 50B. With the dynamo-electric machine at an operating speed, by changing the phase of the single-phase current in the concentrated winding in core 50A relative to the phase of the single-phase current in the concentrated winding in core 50B, the magnetic pole positions in the magnetic layers on the rotor which are described hereinafter will be similarly shifted thereby modifying the voltage generated in the common main windings of stator 50A and 50B. Separate electrical leads 54 and 54A, with portions of each connected to both the main and concentrated windings, of course, insulated from each other, extend from each core and pass through the end bells or the casing wall, using an insulating bushing or the equivalent for this purpose. For some applications, such as use of the entire machine 10 as an AC motor, it may be desirable to have both stators 50A and 50B constructed in one piece as that shown for stator 50. For meeting other requirements, both stators including 50 may be constructed with two separate core sections, such as that shown at 50A and 50B. If the stator 50 is to be used as a motor, the portion of leads 54 going to the main windings of stator 50 will be connected to a source of AC power such as a utility line while the portion of the leads from the concentrated winding will be connected to a source of single-phase AC of the same frequency as that to the main windings. For some requirements only one stator may contain concentrated windings. The main windings in both stators 50, 50A and 50B therein are wound and arranged in the slots to produce a rotating magnetic field when energized with poly-phase AC.

In providing a rotor for the machine, there is placed a bearing retaining member or hub 48 and 48A within the large diameter portion 34 and 34A in each of the support spindles. As is shown, a ball bearing or roller bearing 60 and 60A is placed in an internal bore in each hub member with the outer races of at least one of the bearings being retained between a snap ring and spring washer. The spring washer rides against an inner shoulder of the hub member thereby allowing the bearing to move slightly to compensate for thermal expansion. The assembly is pushed into the largest hub portion 34 or 34A of the spindle 30 or 30A and each is fastened firmly to the end bell, as by machine screws. The hub members 48 and 48A hold the bearing so that the hub members with the bearings therein can be easily removed for servicing. There is a shaft 70 that extends the full length of the machine and has its ends fitted snugly within the inner races of the bearings 60 and 60A. The shaft 70 has at least one end 73 projecting beyond the end bell 20, however the other end 73A of the shaft may or may not extend beyond end bell 20A. The shaft portion between the bearings has an exterior diameter that conforms to the hollow spindle portions through which it passes and there is only a small selected clearance between the shaft and the inside hollow spindle portions 36 and 36A, with the least clearance between the shaft and spindle bore at sections 32 and 32A. The inner surface of the spindle at 32 and 32A may be lined or coated with an anti-friction material such as a lubricant filled plastic material which normally does not touch the shaft 70. This is to reduce the potential of machine damage if either main bearing 60 or 60A fails. In the event of bearing failure, the shaft will then ride on this anti-friction layer until rotation ceases. The central portion of the shaft 70 has a substantially stiffer enlarged diameter portion 71 since this section will carry the high rotational inertia components of the rotor. Upon the periphery of enlarged portion 71 are firmly attached hubs 72 and 72A of two strong large circular radial plate members 74 and 74A meeting together and joined to function as a single drive plate that extends to a periphery thereof nearly at the inner bore 18, but with a small peripheral clearance therebetween. Located a short distance from the outer periphery of plate 74 and 74A are several non-aligned holes 75 in plate 74 and in plate 74A (the latter hole not shown) through the plate to allow air flow through the core windings and into the clearance space at bore 18. The holes 75 in plate 74A are of the same diameter but displaced at an angle from the holes in plate 74 to avoid electrical or electromagnetic communication between windings 52 and 52A. Plates 74 and 74A may be manufactured as a single piece, however this is not the preferred embodiment. At the outside peripheral portion on the sides of the radial plate members 74 and 74A are affixed circular cylindrical sleeves 76 and 76A which each enclose the stator cores 50 and 50A, respectively. These sleeves 76 and 76A may be cast or forged as a part of plates 74 and 74A. A small clearance between the outer surface of the sleeves and the inner bore 18 is desired since it has been found that, contrary to normal expectancy, windage losses due to sleeve rotation decrease as the clearance space is smaller. However, the clearance should be slightly greater than that between the shaft 70 and spindle bore at section 32. The shaft to spindle clearance at 32 and 32A is chosen such that these surfaces will touch before the outer surface of rotor shell 76 and 76A can touch the inner bore of the frame 18 or the inner bore of the magnet layer 82, 82A, and 82B can touch the outer surface of the cores 51, 51A, and 51B, thereby preventing major or total damage in case of a bearing failure.

Figure 1:
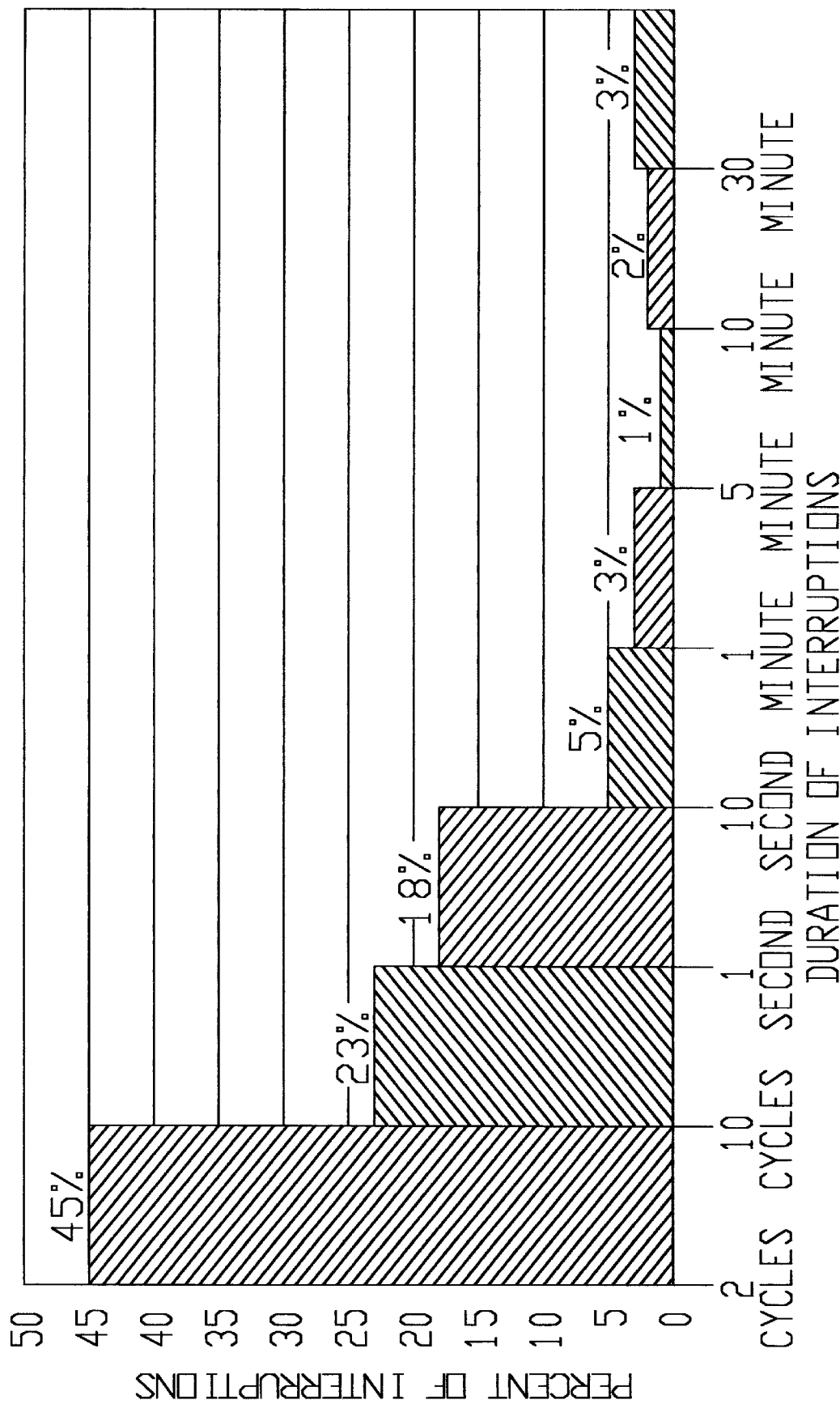
FIG. 1 is a graph showing the experienced quantity and time of duration of power interruptions in electric utility power lines in the U.S.

The cylindrical inside surfaces of the sleeves 76 and 76A are concentric with the outer circular surfaces of their respective stator cores, and on each of these inner sleeve surfaces are attached an electrical rotor core, 80 and 80A. As best viewed in FIG. 3, each rotor core 80 and 80A comprises a low coercive force magnetic material such as a stack of ring shaped punchings of silicon steel. Metal rotor bars 83 and 83A may be employed to improve the starting characteristics of the machine as a motor or the electrical characteristics in a generator, the metal bars are passed through each core 80 which has holes therein in which the metal bars 83 fit snugly and may be attached by welds to end rings. The characteristics and location of these bars are such that the magnetic flux produced by concentrated winding 53C is not significantly impaired. The stack of laminations on the rotor has an outer surface of cylindrical shape that closely matches the inner cylindrical surface of each of the sleeves 76 and 76A and may be immovably held in place by welding or by placing an end ring 79 and 79A at the inner surface of 76 and 76A to hold the outer ends of the cores 80 and 80A tightly against another inside end ring, fixed to the rotor shell, and the rings are welded or otherwise affixed to the shell 76 and 76A. The inner surface of each of the rotor cores 80 and 80A is of a circular cylindrical shape and is concentric with the stator surfaces 51, 51A, and 51B. Upon each of these inner surfaces of the rotor core there is firmly attached, with an epoxy resin or other suitable adhesive, a uniformly thick layer 82 of low electrical conductivity magnetizable permanent magnetic material, such as a ferrite, across the whole exposed inner surface of core 80 and similar spaced apart layers 82A and 82B on the surrounding surface of core 80A. The exposed surface of this layer 82 is spaced at a uniform clearance distance from the surface 51 of the stator, and layers 82A and 82B are spaced a similar distance from surfaces 51A and 51B, and all the layers are generally coextensive with their adjacent stator surfaces. In operation, as the rotor revolves about the stators, the concentrated winding 53C located in each core, when energized with single-phase AC, will generate a pattern of successive north and south magnetic poles in the ferrite layers 82, 82A, or 82B as they rotate past the stator. Suitable circuitry, and its mode of operation is set forth in U.S. Pat. No. 4,177,414 and in FIGS. 1, 2, 3 and 6 thereof in particular, is usable for energizing the concentrated windings in stators 50A and 50B with properly phased single-phase AC, and thereby control and regulate the AC voltage produced in the main windings in these two stators when operating as a generator. Briefly, when an AC voltage output sensor detects a variance in the voltage output from the main windings 53 with respect to a standard voltage, a voltage magnitude control and shifter such as shown in FIG. 1 of U.S. Pat. No. 4,177,414 operates through a driver and inverter to shift the phase of the AC going to the concentrated coil in the smaller stator core 50A, with respect to the phase of the AC going to the concentrated winding in the larger stator core 50B. The north and south magnetic poles in the magnetic layers 82A and 82B will shift with respect to each other, and as a consequence the AC voltage generated in the main winding which passes through both stators 50A and 50B increases or decreases accordingly. Since only small voltage variances usually occur, a small stator core 50A can be employed in which the phase shifting of the AC with respect to the AC in the other concentrated winding is to take place. Unless the output phase of the generator needs to be changed, to parallel with another AC source of the same frequency for example, the phase of the single-phase AC in the concentrated winding in stator core 50B usually remains constant. It will be evident that unexpected benefits, such as precisely controlled AC output, are obtained from the two stator-rotor generator units in a single machine 10.

The construction employing the hollow spindles 30 and 30A for mounting the stators on the end bells is a preferred embodiment of the invention having a number of advantages. However, a simpler stator mounting construction may be employed as shown in FIG. 2A, wherein there is firmly attached to each end bell (only the left end bell 20 being shown), a stator support 330 comprising a circular plate having a central circular shouldered aperture 332 through which the rotor shaft 70 passes. The shouldered aperture 332 has a circular internal cylindrical area which has a small predetermined clearance with the surface of the shaft 70. This shoulder at 332 will prevent the shaft from damaging the windings or other parts of the machine in case the bearing 60, mounted as previously described, supporting the shaft, fails. The stator 350 with a large central aperture therein is fastened by a strong adhesive, such as an epoxy resin, or by machine screws or by bolts passing through the core, to the circular stator mounting and support plate 330. The outer end walls of the stator conform closely to its mating surfaces of the plate 330, and are held tightly against them so that heat generated during use of the stator can flow through the plate 330 to the end bell 20 where it can be dissipated to air passing over the exterior of the end bell. It will be understood that the other or inner faces of the two stators are separated by a space which accommodates the free rotation of radial plate members 74 and 74A carried by the shaft 70.

Referring to FIG. 2, upon the ends of the shaft 70 extending beyond the bearings, at a point just outside of the end bells 20 and 20A, cooling fans 90 and 90A respectively may be attached so that during operation of the rotor the fans will blow air over the fins 24 and 24A on the end bells and thus remove heat that develops in the stators and is conducted thereto by the air movement inside the casing and being conducted thereto through the ends of the spindles 30 and 30A. Attached to each end bell are shields or shrouds 92 and 92A, preferably with deflecting peripheral edges which will help to direct the flow of cooling air across the cooling fins 16 on the casing.

Figure 6:
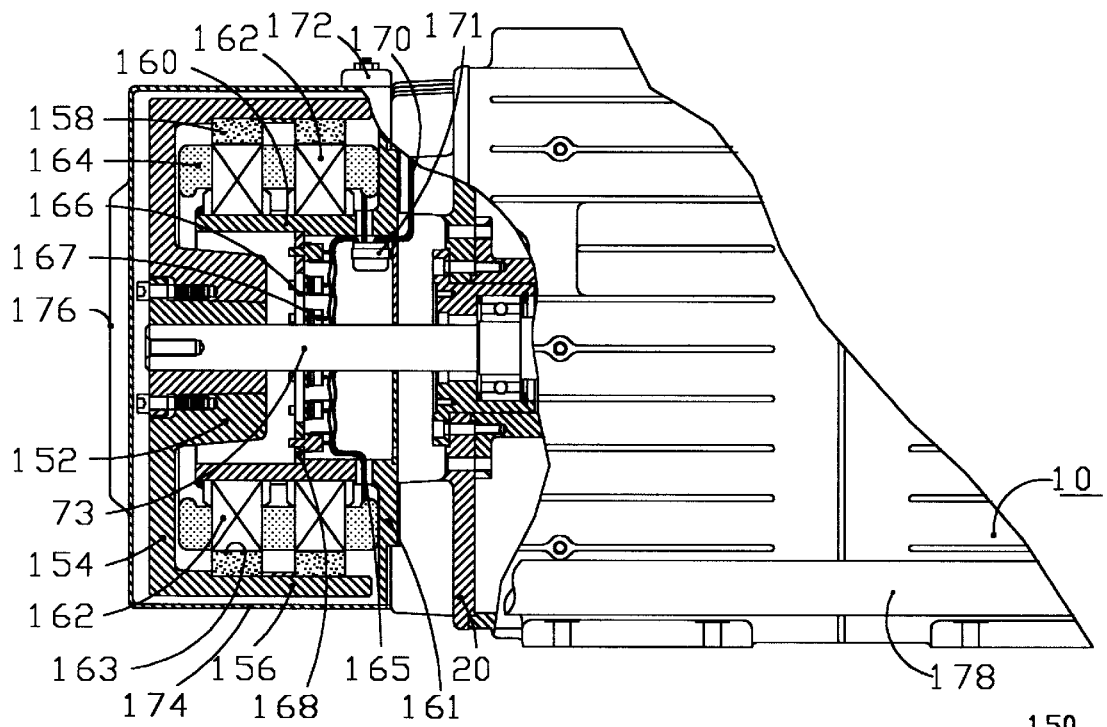
FIG. 6 is a vertical cross-section of a supplemental generator unit to be attached to the dynamo-electric machine of FIG. 2 for producing low-ripple DC.

Many varieties of magnetizable permanent magnetic material can be employed in both the motor and generator rotors of this invention. The layers 82, 82A and 82B for example, preferably are comprised of an electrically non-conductive permanent magnetic material such as a ferrite. Metallic permanent magnetic materials, such as the alnico alloys, can be employed, if they are fabricated in such a manner, as by mixing the powdered alnico metal material with a resinous binder, as to reduce eddy currents therein from the excitation flux to an acceptable level. Barium ferrites and/or strontium ferrites have given excellent results in the practice of this invention. Newer and improved types of ferrites and similar magnetizable permanent magnetic materials are presently being made available and still others are being developed and may be available in the future to use for producing the layers of magnetizable permanent magnetic material in the machine 10. The hysteresis curves of two ferrites that have given good results in motors and in generators are shown in FIG. 6 of our U.S. Pat. No. 4,466,536. An oriented barium ferrite that has been commercially available for some years, under the trade designation Grade 5 ferrite, was tested in a fixture representative of the magnetic paths in an operating motor by subjecting a 0.33 inch (0.84 cm) thick sample to a hysteresis loop test wherein a magnetizing force was applied in one direction and then in the opposite direction and the induction in gauss for the samples was plotted against oersteds of magnetizing force. Curve M in FIG. 6 of U.S. patent shows the hysteresis loop for this sample. The closed circuit magnetic parameters for this material are a Br of 4000 gauss and an Hc of 2300 oersteds. Another available ferrite available under the designation 4112, when tested, exhibited a much squarer and exhibited a smaller hysteresis loop N in the FIG. 6 of that U.S. patent. This last ferrite exhibited closed circuit properties of a Br of about 4300 gauss, and about 1200 oersteds for Hc. This ferrite exhibits much lower hysteresis loss during rotor pole changing while maintaining a high energy product.

For many applications, it has been found desirable to have an independent source of AC power for the controls of the machine 10, and even more beneficially for the controls of UPS systems embodying the machine 10. It has been found that this can be readily accomplished by placing a relatively small permanent magnet AC generator on one of the shaft extensions such, for example, as at the right shaft end of 73A just outside of the end bell 20A. As shown in the enlarged detail of FIG. 2, several small magnetized permanent magnets 120 are attached at a fixed radial distance upon the hub carrying the fan blades of fan 90A. There is attached to the end bell 20A, for example, on the exterior surface of the circular bearing hub 48A, a metal ring carrying a small electrical stator 122 with electrical windings therein. When the permanent magnets, arranged so that north and south poles alternately pass by the stator windings when the shaft 73A turns, they will generate an alternating current in the stator windings located in the core of stator 122. An electrical lead 125 from the stator windings is provided to run along the outside surface of the end bell to the exterior from where it can be brought to a point of use in a control circuit.

Figure 7A:
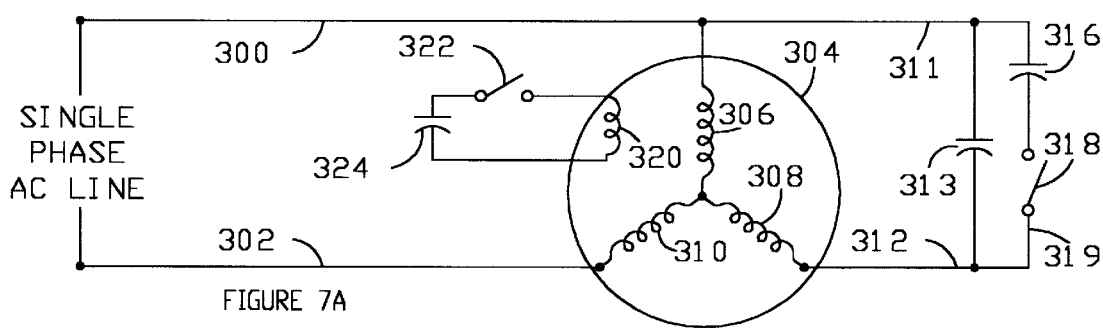
FIG. 7 is a circuit diagram of two circuits comprising circuits 7A and 7B, each suitable for supplying single-phase AC to enable efficient operation of the AC motor of FIG. 2, FIG. 5, FIG. 6, FIG. 9 or FIG. 10.
Figure 7B:
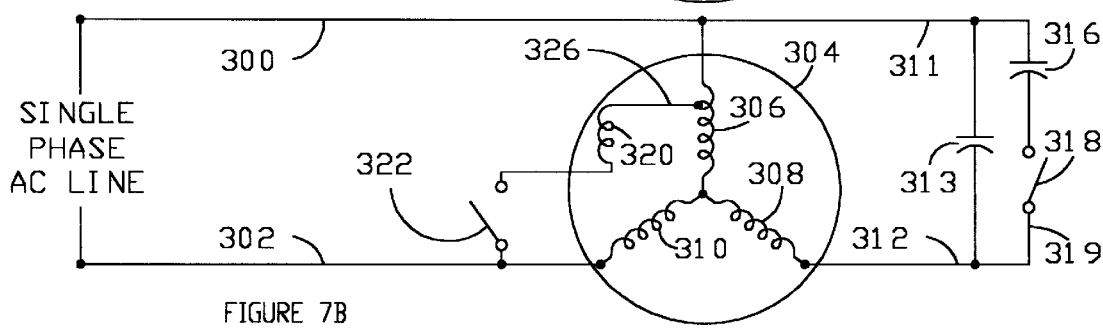

As previously mentioned, the versatile dynamo-electric machine 10 of FIGS. 2 and 3 can operate with both pairs of stators and rotors functioning as an AC motor; or both pairs of rotor-stator units can function as AC generators; or either pair alone functioning as an AC motor and the other pair as an AC generator. In this last combination the machine 10 forms an extremely useful AC motor-generator machine. Referring to FIG. 7, this motor-generator arrangement of the machine 10 is accomplished by simply connecting the leads from the main windings of either stator to a source of AC power, with the leads to its concentrated windings being connected through a switch to a source of single-phase AC of the same frequency as in the main windings as shown in FIG. 7B or the concentrated winding may be tuned with capacitor 324 as shown in FIG. 7A. So connected, this stator-rotor pair will operate as a highly efficient AC motor. The other stator-rotor pair functions as a generator with the leads from the main windings being connected to a load, and the leads to the concentrated windings are supplied single-phase AC of the frequency required by the load, or in the cases where the load is not frequency sensitive, the concentrated windings may be connected to a capacitor as shown in FIG. 7A.. In most cases in the United States and Canada, the AC is of a 60 Hz frequency. However, the motor can be operated by supplying 60 Hz AC to the motor windings of a two pole motor, and single-phase AC of a different frequency to the concentrated windings of the generator portion, and AC power at such different frequency will be produced by the generator and furnished to a load while the dynamo-electric machine is turning at synchronous speed. When the shaft is rotated by an external engine, both pairs of stator windings can be connected to generate AC which can supply the same or separate loads.

Outstanding benefits in the case of failure of outside AC power, are obtained when the dynamo-electric machine 10 is operating in the motor-generator mode. The very high rotational inertia of the rotor and the pole writing accomplished by the concentrated windings enables the machine to continue supplying AC power at full rated load of a desired frequency and at a desired voltage for relatively long periods of time of the order of from 10 to 20 seconds after the AC power supply to the motor has been interrupted. Due to this long ride-through property, the motor-generator mode use of the machine 10 of FIGS. 2 and 3 has great utility for many sensitive applications depending on continuous AC power for their functioning. This long ride-through time allows sufficient time for supplying AC to the load when only a short time of, up to as much as 10 seconds, interruption of the outside AC source occurs and when AC power is again available, which represents the great majority (up to 86%) of power interruption incidents as shown in FIG. 1. When the usable AC power supply from the power line is resumed, the motor will speed up rapidly to its normal running speed. If a longer line interruption occurs, then the long ride-through allows putting into operation alternate AC electrical power sources such as a separate engine driven AC generator. Such alternate AC power source generates AC that is passed to the motor of the machine 10 which continues generating AC to supply the AC load so that the load equipment being energized operates without any interruption, and the AC to the load is at its required voltage and frequency at all times. Also of great importance, the construction of the dynamo-electric machine 10 provides virtually total electrical and magnetic isolation between the windings 52 and 52A, yet maintains the simplicity of a compact two bearing construction.

Figure 4:
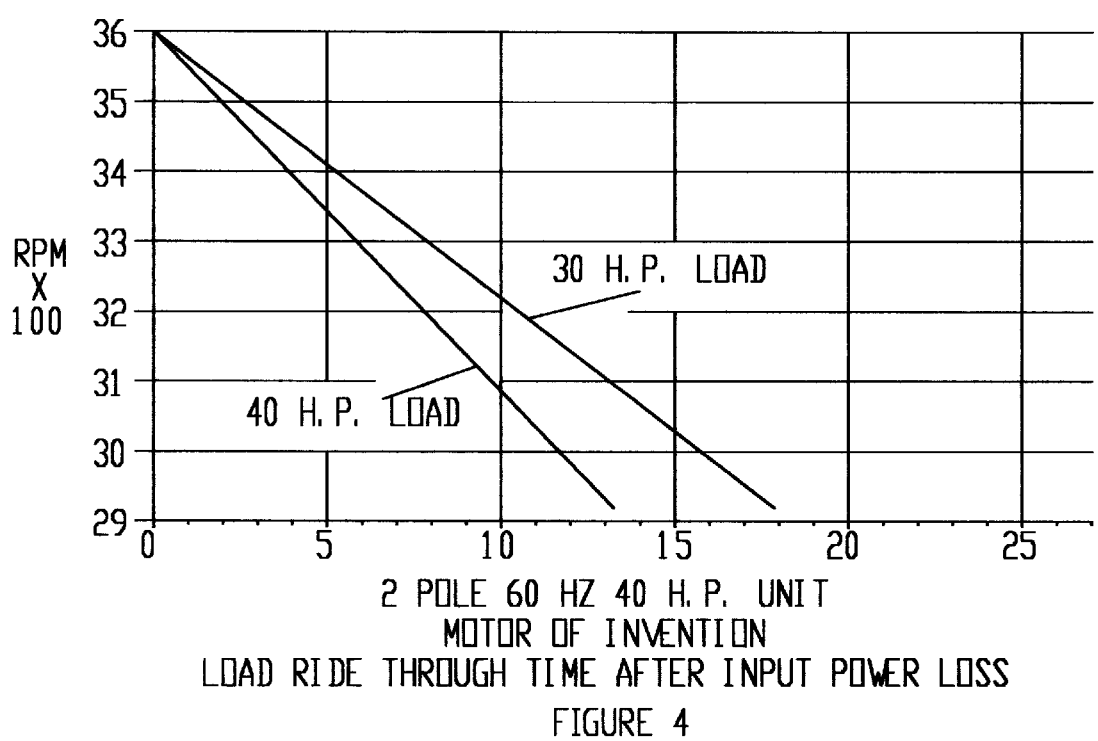
FIG. 4 is a diagram plotting ride-through time of a dynamo-electric machine of FIG. 2, in which at least one stator-rotor operates as a motor, wherein shaft RPM is plotted against time after an AC power interruption thereto.
Figure 10:
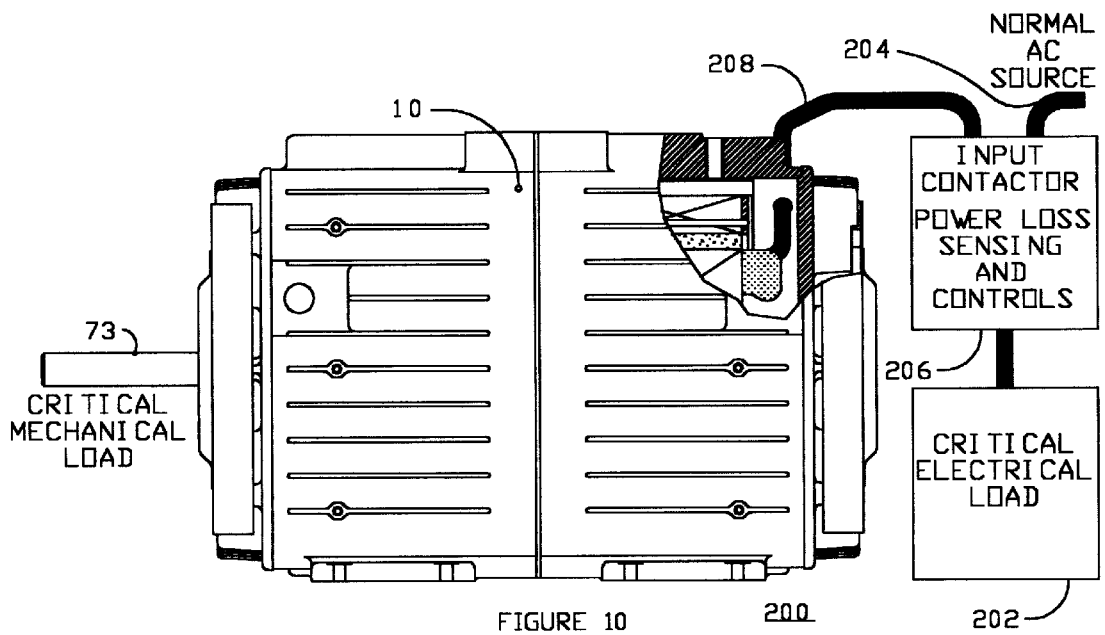
FIG. 10 is a frontal elevation of a modified UPS system, partly in section, embodying the dynamo-electric machine of FIG. 2 and capable of supporting both a mechanical and an electrical load simultaneously.

Referring to FIG. 4 of the drawings, there is shown in a graph the period of ride-through time supplied by a 40 horsepower (about 30 kW) unit of the FIG. 2 construction operating on 60 Hz AC. This is from a two pole unit that operates at 3600 RPM at full running speed. When the AC power to the motor was interrupted, the AC machine of this invention maintained output to a full 40 horsepower (30 kW) load for more than 11 seconds before its speed decreased to 3000 RPM. When the load was reduced to a 30 horsepower (about 22.5 kW) level of use, the AC power output lasted over 15 seconds before the rotor slowed to 3000 RPM. Approximately 30% of the kinetic energy of the rotor is thereby converted to AC energy during this ride-through period. These are very useful long ride-through time intervals. As will be explained subsequently in detail, FIG. 10 shows the application of this unit 10 to supply a mechanical load, such as a critical blower or pump, while simultaneously supplying a critical electrical load to maintain operation of the blower or pump and associated electrical controls during power interruptions lasting up to 10 seconds or more.

Further, the machine 10, operating as a motor-generator, can be directly associated with a driving engine in a relatively compact, reliable and simple package where in it can be directly driven by the engine at a selected time interval after an AC power interruption occurs from the outside AC source, whereby to keep on producing power from the generator without any break or significant change in the frequency or voltage of the power output to the load during such interval. Further, the previous AC motor component of the unit 10 can be readily and automatically converted into an AC generator rotated by the engine and connected to a circuit to supply lighting or other emergency power to equipment which would also have been interrupted by the failure of flow of the AC power from the original AC source.

Figure 5:
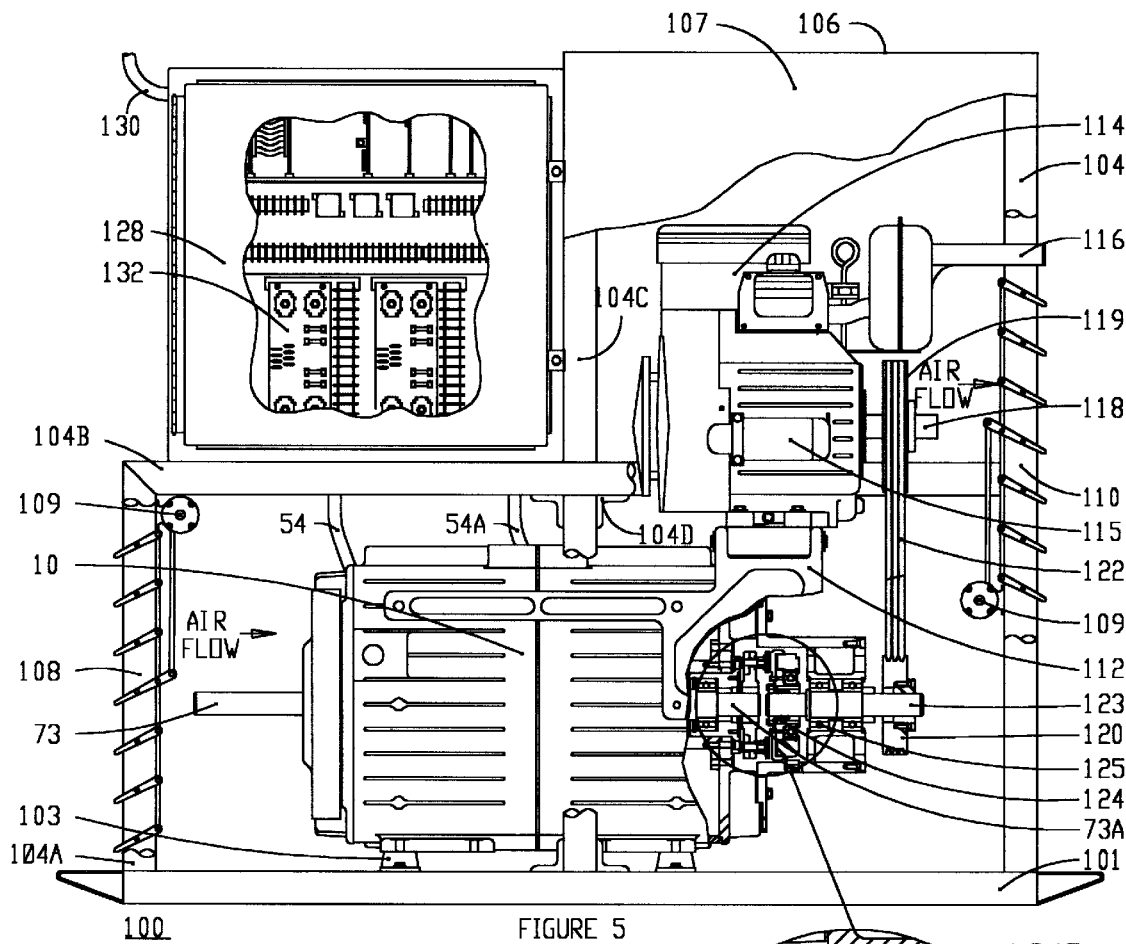
FIG. 5 is a frontal elevation of a UPS system, partly broken and partly in section, embodying the dynamo-electric machine of FIG. 2.

Referring to FIG. 5 of the drawings, there is shown such a compact, portable, and self contained UPS system 100 embodying the versatile dynamo-electric machine 10 shown and described in FIGS. 2 and 3. The machine 10 is mounted on a strong base 101 of fabricated steel, for example. On the base 101 are resilient isolation mounts 103 through which the feet 15 of the machine 10 are bolted to it. An enclosed housing 106 is attached to the base, and it comprises metal frame members 104, 104A, 104B, 104C, and 104D, all welded, bolted, or otherwise joined into a strong and firm framework. The exterior surfaces are covered with sheets 107 of steel or the like, attached to the frame members to form the enclosing cabinet or housing 106. In order to provide easy access into the cabinet, one or more of the panels, particularly on the front side seen in the drawing and the back on the opposite side, may be hinged lockable panels or doors, with flexible gasketing at the edges where they meet the framework. As shown somewhat schematically, the left hand side panel has a large aperture in which is fitted a movable air-intake louver 108 operated by a thermostatic control 109 in order to allow a controlled amount of cooling air to enter the cabinet. A louvered air outlet 110, which may also have a thermostatic control 109, is placed in the right hand panel on the opposite side, to allow heated air which has passed over the casing of machine 10 to escape from the cabinet housing 106.

Mounted on a bracket 112 attached to the casing of the dynamo-electric machine 10 is an engine 114, powerful enough to drive the rotor of machine 10 so as to produce full AC to the load when the AC source input to the motor has been interrupted for more than a selected period of a few seconds. An engine exhaust pipe 116 may project through the cabinet panel to the exterior where engine exhaust gases can be vented into a vent or stack. The engine 114 has a drive shaft 118 to which is fastened a pulley 119. Attached to machine 10 and aligned axially with shaft 73A, is a shaft 123 supported by a bearing pair 125 and attached to the outer face of an electrically operable clutch 124. A pulley 120 affixed to the end of shaft 123 is driveably connected to pulley 119 by drive belt means 122. The pulley diameters of 120 and 119 are determined by the ratio of the optimum engine speed and the desired rotor speed of the machine 10.

An enlarged view connected to the starting clutch portion of FIG. 5 shows the details of the connection of the clutch components on the shaft end 73A of the machine 10, to the drive shaft 123 which latter is mounted on two bearings 125. Normally the shaft end 73A rotates and rotatably carries a portion that is the clutch drive disk proper 124A which comprises axially movable pads 124C, normally held in a retracted position by springs. Thus only the shaft 73A rotates and shaft 123 is stationary. The electrically operable portion 124 of the clutch has a stationary electro-magnet 124B supported by ball bearings, as shown, which when energized with electrical current produces a magnetic field that cause the pads 124C, which constitute the clutch face of 124A, to move out and come into firm magnetically attracted contact with a mating face 124D of clutch portion 124. When this occurs, the clutch engages with and causes the shaft 123 to be rotated by shaft 73A. Electrically operable clutches of this type are commercially available.

Except for testing, the electrically operable clutch 124 is normally not in an engaging position as long as AC power from the source operates the motor of the machine 10, and the power is not interrupted, allowing the shaft 123 and pulley 120 to remain stationary. However when the AC power is interrupted, the electro-magnet clutch 124B can be energized by an electrical control means at any time interval desired and the pulley 120 is immediately and firmly connected through shaft 123 to shaft 73A and turns with it as it rotates. On the loss of input AC power, electronic sensors associated with the AC power lines to the AC motor in the machine 10 will signal the electrical controls to immediately begin supplying single-phase AC to the concentrated windings of the generator in order to continue to supply the desired voltage, frequency and phase AC to the load. After a predetermined selected time interval which usually will be in the range of from about 3 to 10 seconds, and if AC power to the motor is not restarted, the controls will energize the clutch. The rotational energy of the rotor of the dynamoelectric machine 10 will then supply the torque necessary to start the engine so that it will rotate the rotor of machine 10 and thus continue producing in the AC generator thereof AC of the voltage and frequency needed by the load. If after a brief period when input AC from the source is lost, usable AC power is again available from the AC source, the electronic sensors will disengage the clutch and engine, if it has been started, close the switch in the motor leads to the AC source, and the AC motor and its concentrated windings will immediately be energized and will pick up speed, and in a short period the machine 10 will be running at full speed. When at full speed, the single-phase AC to the concentrated windings in both the generator and motor will normally be turned off. The load will be supplied without any break or interruption with AC of the desired voltage and frequency during all this time.

To sum up, about 90% of all power interruptions will not need the engine 114 being put into operation. If AC power is not restored in this initial selected period of from 3 to 10 seconds, the clutch 124 is energized. The pulley 120 will then drive belts 122 and thus drive the pulley 119 and the engine shaft 118 so as to rotate the engine. The electrical controls will concurrently turn on the engine ignition, fuel system and governor so that the engine can start promptly when its shaft is turned. A starting time of less than a second is readily obtainable. This easy and rapid start is particularly feasible because the warmed air from the machine 10 passes over the engine and keeps the engine 114 and its oil warm at all times during use and therefore at an optimum starting condition. One of the benefits of the delay in starting time is to reduce nuisance engine starting when the power outage lasts only a few seconds. The engine may be an air or water cooled gas engine, but diesel engines or other prime movers can be employed.

A separate control cabinet 128 is attached to the top panel of the left hand portion of the housing of cabinet 106. The outside AC power line cable 130 enters the cabinet where switches, the sensors, and controls 132 for both the machine 10 and the engine 114 are located. A lockable front door is preferably used on the cabinet 128. Leads 54 and 54A from the machine 10 also enter the cabinet wherein the sensors and switches operating on the electrical circuits determine the operation thereof, and function in response to interruption and the return of AC power from the AC source.

Figure 5A:
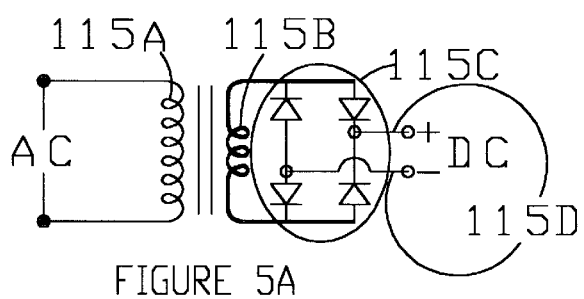
FIG. 5A is a circuit diagram of an AC to DC supply for an engine starter motor.
Figure 5B:
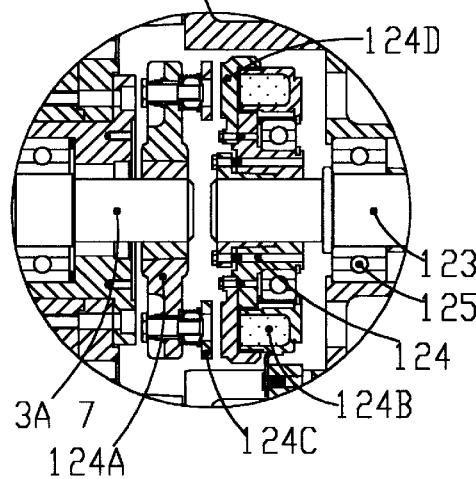
FIG. 5B is an enlarged portion of FIG. 5 as shown.

It may be desirable for several reasons to have the engine partially started before the clutch 124 is allowed to function. Since shaft 70 will still be rotating at a high speed when the clutch 124 is energized to cause it to engage the non-rotating shaft 124 which is connected by belts 122 to the non-rotating engine shaft 118, there will still be a heavy initial shock load experienced by the clutch 124 and the pulleys. In addition, a partially started engine can be lubricated to some extent before running at full speed. To effect a partial starting, there may be used a separate conventional type of engine starter, using 12 volt DC electrical power supplied to the electrical motor thereof, for example, in which the starter is operated at a time of about three seconds or so preceding the energizing of clutch 124. The 12 volt DC electrical power to the starter motor may be readily supplied by using the AC motor portion of the machine 10. When the outside AC power source is interrupted and the sensors operate the line switch to cut off power leads 54 thereof from the AC source, the stator 50 automatically begins to generate AC voltage in response to the magnetic poles in layer 82 in the still rotating rotor 50. When the interruption of power in the supply source occurs, the electrical sensor is programmed to function to connect to leads 54 to a circuit to a step-down transformer, schematically shown in FIG. 5A, where the AC voltage from the main windings of stator 50 passes through the high voltage windings 115A in the step-down transformer, and this results in the low voltage windings 115B delivering an AC current of about 12 volts, for example, and this low voltage is rectified in a rectifier 115C to a DC voltage of 12 volts in the rectifier output leads 115D which are connected to a conventional engine starter having a direct current motor connected to an engine starter gear which, as is well known, turns a splined shaft on which a driving gear is thrown by centrifugal action to mesh with a pinion gear on the engine shaft and thus turns the engine shaft. When the engine reaches a speed of a few hundred revolutions per minute, it begins to run under its own power. At this point the engine starter gear automatically retracts and the starter motor may be turned off by a switch in circuit 115D. The engine being set in motion and accelerating, the switch operating clutch 124 will then be caused to close and clutch 124 applies full power to the still slowly rotating gear shaft to cause it to accelerate quickly to reach full speed.

For certain electrical equipment using constant AC power, for which the UPS system of FIG. 5 could be beneficially employed, there is sometimes required an additional DC (direct current) supply of very low ripple. This requirement may be met by attaching to the end of the shaft extension 73 of the machine 10 in the FIG. 5 UPS unit, a direct current generating unit 150 as shown in FIG. 6 of the drawings. The unit 150 comprises a hub member 152 attached by bolts or the like to the end of the shaft extension 73, the hub member comprises a radially extending plate 154 which carries at its periphery a circular cylindrical rotor sleeve 156. On the inner surface of the rotor sleeve 156 is firmly attached a relatively uniformly thick layer 158 of magnetizable permanent magnetic material, such as a ferrite which can be magnetized into a large number of successive circumferentially arrayed north and south magnetic poles. The inner exposed surface of layer 158 is a surface of a circular cylindrical shape coaxial with shaft 73. A stator assembly cooperating with the rotor, is provided by attaching to the end bell 20 a cylindrical ring shaped metal plate 161 to which is attached an annular sleeve 160 which extends into the sleeve 156 to a point short of its inner wall. Upon the outer surface of the annular sleeve 160, is attached a stator core 162, for example, an annular ring of a plurality of stacked and bonded electrical steel laminations affixed to the exterior surface of sleeve 160 with slots in the outer surface 163 of the stack of laminations running parallel to or slightly skewed with respect to the shaft axis, with electrical main windings 164 being placed in the slots. These slots may contain concentrated windings similar to 53C in FIG. 3 operable as previously described. There is a small clearance between the exterior surface 163 of the core 162 and the layer 158. The stator core may be a single continuous stack of laminations or, as shown, two (or more) separate stacks separated by a space, with a spacer between the core stacks. The space between the cores is to allow the placement on each core of individual concentrated windings similar to the separate concentrated windings 53C (FIG. 3) in each stator core 50B and 50C, shown in FIG. 2. During operation, if the phase of the current in one of the concentrated windings is changed relative to the phase of the current in the other, the magnetic poles in the magnetic layers on the rotor will be similarly displaced, thereby modifying the voltage generated in the total main windings 164. When the rotor revolves about the stator core 162, the alternate north and south magnetic poles in the layer 158 will generate a high frequency AC, in the order of several hundred Hertz, in the stator windings 164 and this current is carried by leads 165 to a rectifier assembly 166 which may comprise a series of diodes 167 affixed on a flat thermally conductive ring 168 attached to the inside surface of the sleeve 160. The diodes produce a direct current output with a very low ripple from the polyphase high frequency AC current from the stator, and two, or multiples of two, leads 170 pass through electrical filters 171, and then pass outside of the sleeve 160 to insulated electrical terminal posts 172 placed outside a protective enclosing casing 174 which is attached to the periphery of the end bell 20. The construction and relation of the rotor parts 154 and 156, support sleeve 160 and plate 161, outer housing 174 and filter 171 are such as to greatly reduce any electromagnetic radiation from diodes 167 and windings 164. Cooling fins 176 may be placed on the end of casing 174. Heat generated by the diodes 167 and windings 164 is conducted through the sleeve 160 and circular plate 161 to the cooling fins on end bell 20A. Additional cooling may be provided by passing air over the fins from fan 90 (FIG. 2) through duct 178.

The dynamo-electric machine 10 of this invention, when one or both stator-rotor pairs operate as single-phase motors, has outstanding properties. The single-phase motor will easily start from stand-still with extremely low inrush current. Where prior art single-phase induction motors, in starting require an inrush current of from 6 to 11 times the full load running current, and such inrush currents are so large that they can cause such severe line voltage drop that electric utilities refuse to allow single-phase AC motors above about 10 horsepower (7.5 kW) to be put on a single-phase power line. By contrast, the single-phase motors of the present invention ordinarily will have an across-the-line starting current of about 2 times the full load running current, and these motors also have a running efficiency exceeding that of any known single-phase induction motor.

For starting a single-phase AC motor having the versatile dual stator-rotor pairs construction of this invention two different circuit arrangements may be employed. FIGS. 7A and 7B, in FIG. 7, illustrate these two circuits. In FIG. 7A, the single-phase AC power is carried by conductor lines 300 and 302 to the schematically shown motor 304 whose windings comprise main winding 306, 308 and 310 arranged in the slots of a stator so as to produce a rotating magnetic field when properly energized by the AC. Windings 306 and 310 receive single-phase AC directly from line 300 and 302 respectively. To supply single-phase AC power to core 308, single-phase AC from line 300 is conveyed by line 311 to one terminal of a running capacitor 313. The other terminal of the running capacitor 313 is connected by line 312 to the winding 308 of the motor. During motor operation, this running capacitor 313 is usually connected to the winding 308. In order to start the motor with a sufficiently high torque from a rotor stand-still condition, a starting capacitor 316, having more farads of capacity than the running capacitor 313, usually being from two to as much as ten times larger, receives single-phase AC from line 311 at one terminal, and the other terminal of this capacitor is connected by line 319 to line 312 and then to the winding 308 with a speed responsive switch 318 being inserted in line 319. The switch 318 is closed when the motor is being started and opens only after the rotor of the single-phase AC motor reaches about 70 to 90% of its synchronous speed. Speed responsive electronic switches suitable for such operation are available. Alternatively, there may be used a centrifugal switch on the rotor which is spring adjusted to let it open the circuit at a selected speed. The exciter or concentrated winding 320 of the motor is energized by the magnetic field in the cores 50 and 50A, and the poles created in the layer of magnetic material on the rotor as the rotor passes over the concentrated winding 320. The concentrated windings 320 are in an independent circuit comprising a circuit control switch 322 and a tuning capacitor 324. The switch 322 is closed when the rotor reaches 85–90% of synchronous speed. The concentrated winding will thereupon magnetize the layer of magnetizable permanent magnetic material into a pattern of north and south magnetic poles and this will greatly increase the motor torque and the switch 322 is opened when the motor reaches synchronous speed.

The circuit diagrammed in FIG. 7B is essentially the same as that of FIG. 7A except there is no capacitor in the circuit to the concentrated windings 320. In this latter Figure, a lead 322 from the single-phase line 302 goes to one terminal of switch 324 with the concentrated winding 320 connected to the other switch terminal. The other terminal of the concentrated winding 320 goes through a line 326 which is joined to a selected point in the main winding 306. The phase and level of voltage from the single-phase AC line 300 that is going to line 326 is regulated by such selected contact point in the main winding 306. The voltage and phase are selected to magnetize the rotor poles in a position to develop high torque when reacting to the rotational field of winding 306, 308, and 310. There are other well known main winding and starting-running capacitor configurations that can be utilized in single-phase motors which may be employed in certain cases. In any event the concentrated windings would be connected essentially as shown.

Figure 8:
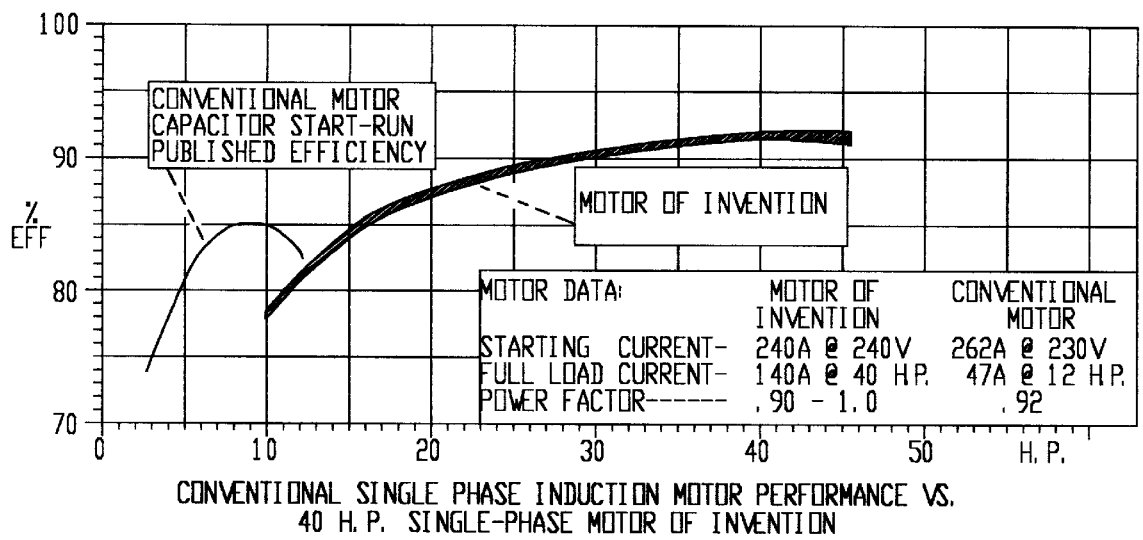
FIG. 8 is a graph plotting efficiency curves of conventional single-phase motors and a single-phase motor of the present invention.

Single-phase AC motors comprising the dynamo-electric machine 10, have been constructed and tested with one or both pairs of stators and rotors operating as motors. Such single-phase AC motors have given outstanding operating results. Referring to FIG. 8, there are shown graphs and a table comparing the performance of a typical, conventional, commercially available, single-phase nominal 12 horsepower (about 9 kW) AC motor available in the industry with data from a 40 horsepower (about 30 kW) motor single-phase AC motor such as the machine 10 constructed as shown in FIGS. 2 and 3.

At present, the commercially available 12 horsepower motor, when being started from stand-still, will draw 262 amperes from a 60 Hz 230 volt single-phase line, and at its full speed the motor delivered 12 horsepower and the current drawn was 47 amperes. It reached a top efficiency of 85%. Its power factor was 0.82. The single-phase motor constructed in accordance with the present invention of a 40 horsepower rating, required a starting current of 240 amperes at 240 volts. At full load its electrical efficiency exceeded 92%, and its power factor was in the range of 0.98 to 1.0. These outstanding results are all better in every respect than the results for the commercially available single-phase AC motors in the electrical industry today.

The use of single-phase motors of the present invention would be highly desirable in many areas at the present time. Due to the very low starting current of these motors, there are many single-phase electrical power lines that could advantageously use the single-phase motor of this invention for a multitude of applications. Remote oil wells could be pumped at desired intervals with remote control or automatic time switches connecting the single-phase motors with a single-phase AC power line. Sewage pumps, irrigation wells, and wells for watering golf courses and the like, could use the relatively inexpensive, high efficiency, reliable single-phase AC motors of this invention with available single-phase AC lines as compared to expensive diesel engines, or using 3-phase motors requiring phase converters or 3-phase AC power lines now being required. Many farms have single-phase AC available but are not presently able to use large electrical motors since there are no reliable low starting current single-phase motors in the large sizes they need. The single-phase AC motor of the present invention would easily and efficiently handle these needs using available single-phase power lines. The ability to operate the motor portion of the FIG. 2 design from a single-phase AC source while supplying either single-phase or 3-phase power from the generator to a critical load is also very important for many applications.

Some industrial applications require not only a UPS system to furnish AC power to a load, but they also have a critical motor-driven mechanical load that needs to be kept functioning without interruption or for a period of time after AC power from the source is interrupted. One area for this dual need is in gas and other fuel fired ovens and in drying systems. Gas, for example, is supplied under pressure to a burner in an oven and an air supply fan or air blower must operate to steadily supply combustion air without any interruption to the burner in the combustion chamber of the oven to consume the gas. If the air fan or blower ceases to function and unburned gas is present in or is still flowing to the combustion chamber, an undesirable explosive mixture can form which would create a dangerous situation.

In FIG. 10, there is shown a short period UPS system 200 that can supply mechanical power as well as electrical AC power to a critical electrical load 202, for a period of time, typically 10 to 20 seconds, after AC power from an AC source has ceased to flow in conductor 204 therefrom into a control unit 206 which supplies AC power through lead 208 to the UPS machine 200, which comprises a dynamo-electric machine 10. Shaft 73 of the machine 10 is connected to a fan or blower, for example by a pulley on the shaft and a belt drive (not shown) to a pulley connected to a fan or blower. If AC power is interrupted in conductor 204, the high rotational inertia in the dynamo-electric machine 10 will keep shaft 73 turning and the fan or blower will continue introducing air into a combustion area for a period of many seconds to assure the combustion of gases going to the oven. In most instances power will be restored before the lowest acceptable speed is reached and the combustion or other processes continue without interruption. In this period of time controls associated with the critical load 202 will be supported electrically and be able to terminate the flow of combustible material to the furnace if the power interruption lasts longer than 10 seconds or so and the air flow will purge the combustion chamber.

When both stator-rotor pairs of the dynamo-electric machine 10 are operated as a dual AC motor, a number of desirable operating advantages can be obtained by applying the AC from an AC power source to the stator windings in selected ways through certain circuitry arrangements. One such operating advantage can be secured when it is desired to minimize the inrush starting current when the motor unit is being started from stand-still and accelerated to full speed. Another significant advantage can be obtained when the dual motor machine 10 is connected to a very heavy load and a high torque is needed to start the load and to get it to full speed. Such a heavy load occurs in coal and stone crushers, and also when a gas or air compressor being operated by the motor is operating against a high pressure in a compressed air or gas tank, and the driving motor must start from a stand-still condition. A third beneficial condition is met when it is important to control the input power factor when the motor is running at full speed.

Figure 11:
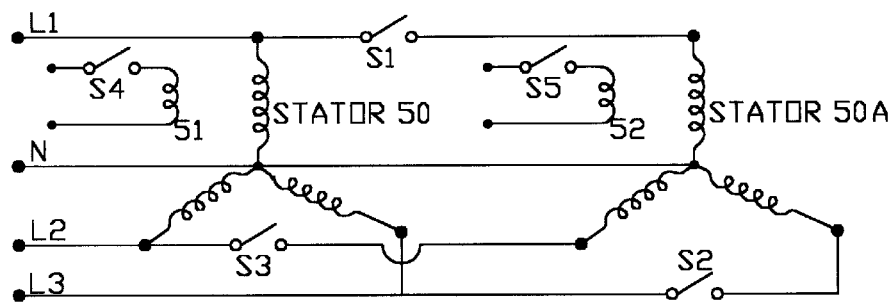
FIG. 11 is a circuit diagram for supplying AC power to the dynamo-electric machine of FIG. 2, operating as a motor, to enable starting with very low inrush current.

In the first case, namely, the lowest inrush current operation, the dual motor dynamo-electric motor unit is started by initially applying AC power to only one stator-rotor pair and thereby accelerating the rotor slowly, at about half the rate if both stator and rotor pairs were being simultaneously energized. A suitable circuit to accomplish this is shown in FIG. 11, wherein a three-phase line comprising line conductors L, L2, and L3 with a voltage rating, for example, of 208 volts, supplies AC to both stator 50 and 50A. In this particular application, both stators are wound alike and each comprises a single core with three main and at least one concentrated winding. In starting, switches S1, S2, and S3 are open and no AC voltage is supplied to stator 50A. When the main line switch to the AC power source line (not shown) is closed, AC at 208 volts is supplied to the three main windings of stator 50, producing a rotating magnetic field which causes induction and hysteresis torque to be developed in the rotor. Under these starting conditions an inrush current of very low amperage is drawn from the AC power line. The rotor accelerates at about half the normal rate that it would if both stators and rotors were to be energized with AC power. When the rotor speed reaches over about 75% of full or synchronous speed, i.e. the rotor is at about 2700 RPM for a two pole machine with 60 Hz AC input, the switches S1, S2, and S3 are closed so that the main windings in stator 50A are energized. When the rotor reaches about 85–90% of synchronous speed, switches S4 and S5 are closed so that the concentrated windings in the stators will generate magnetic poles in its associated magnetic layer as previously described and with an increased torque induced thereby the rotor will accelerate rapidly and will reach its full or synchronous speed quite quickly.

Figure 12:
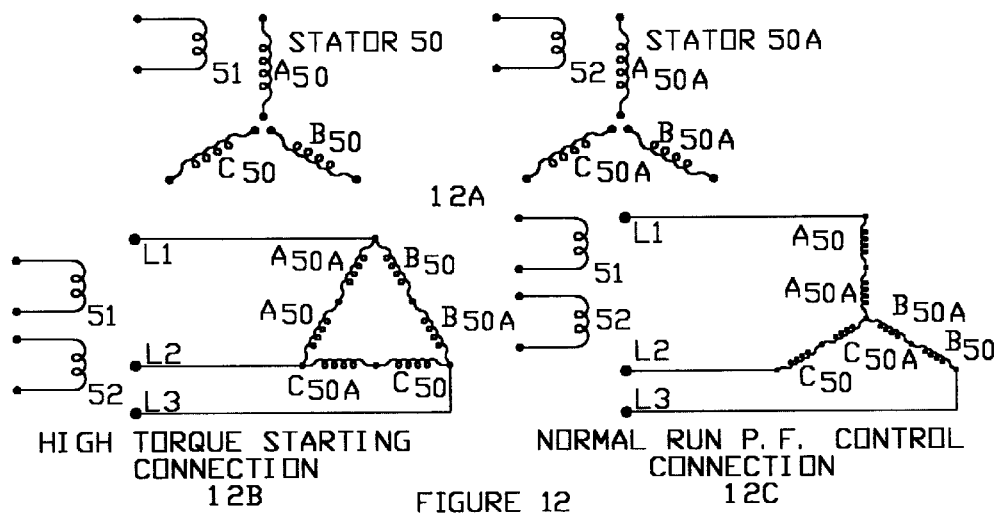
FIG. 12 is a circuit diagram comprising three circuits, 12A, 12B and 12C, for supplying AC power to the dynamo-electric machine of FIG. 2, functioning as a motor, FIG. 12B to provide high torque starting and FIG. 12C for efficient full speed operation and also to enable the input power factor of the motor to be modified.

When the dual motor unit 10, has to start under a high load, the circuits shown in FIG. 12 are advantageously used. In FIG. 12A, the circuits to the stators 50 and 50A are shown schematically, wherein stator 50 has three main windings A50, B50, and C50, while stator 50A has three main windings A50A, B50A, and C50A. For a line voltage 208 volts, each of the main windings will be wound for about 80 volts, or a total of about 160 volts when each pair of stators are serially connected in a delta circuit arrangement as shown in FIG. 12B. A circuit is provided so that for starting, a three pole switch will join all the main windings of both stators into the delta configuration of FIG. 12B. This results in a higher than normal starting current passing through all the main windings and this causes a very high starting torque condition by reaction of this large rotating magnetic field with the magnetic layers of both rotors, and this high torque will move the rotor against any reasonable heavy load. The starting or inrush current is necessarily higher than normal, but it still will be greatly less than that of a conventional squirrel-cage induction motor of the same rating. The rotor will accelerate and when a predetermined speed is reached, which may be set at from about 90% to 100% of synchronous speed, the three pole switches to the lines to the main windings are operated to a second position so as to connect the main windings in a wye arrangement as shown in FIG. 12C, and the dual AC motor unit will then operate in a normal torque condition. When the rotor reaches about 85% to 90% of its full running speed, the concentrated windings 51 and 52 of both stators will be energized with single-phase AC of the same frequency as the AC in the main windings, so that the magnetic layers 82 and 82A will be magnetized into a magnetic pole pattern that will react strongly with the rotating fields of the main windings and the rotor will accelerate rapidly to reach synchronous speed. Depending on the particular characteristics desired, the concentrated windings 51 and 52 may be connected in the same manner as winding 320 is shown in FIG. 7 or 7A. When connected in a wye connection, the main windings being wound for the voltages involved, the motor is capable of operating at unity power factor with line voltages as high as 270 volts, based on this nominal 208 volts example, when at full speed. At lower voltages this will allow the motor to operate with a leading power factor. This last will allow the motor to benefit the utility power lines so as to compensate for a lagging power factor on the utility power line caused by such loads as conventional induction motors. Further, by varying the phase in one of the concentrated windings as compared to the phase in any of the other concentrated windings in the stator, the total back EMF being generated by the main windings in the stator will be modified. This will allow the input power factor of the motor to be adjusted advantageously to meet various operating conditions.

Usually the concentrated windings in either or both of the motor stators of machine 10, are supplied single-phase AC only during the starting of the motor until the rotor reaches synchronous speed. Once synchronous speed is reached, the supply of single-phase AC to the concentrated windings is terminated by opening the circuit thereto in FIG. 7, the switches 322 are opened, and in FIG. 11, switches S4 and S5 are opened. These switches in the circuits to the concentrated windings may be controlled by a sensor operating upon synchronous speed being reached. However, it may be desirable to close the switches to the concentrated windings at intervals to supply single-phase AC to correct the rotor magnetic field or overcome "hunting" or fluctuating rotor speeds, and thus bring the rotors back to synchronous speed. This timed re-energizing of the concentrated windings need be for only a brief period of a second or so.

The circuits in FIGS. 11 and 12 and the detailed description of their use were specific to a three-phase AC power source for operating the dual AC motor configuration. However, similar benefits can be obtained when single-phase AC is supplied to the main windings of both stators. The circuits shown in FIG. 7 can be used in such single-phase motor operation. There are commercially available wye to delta starters that can be used for the delta to wye switching configurations for the single-phase motor windings.

Figure 9:
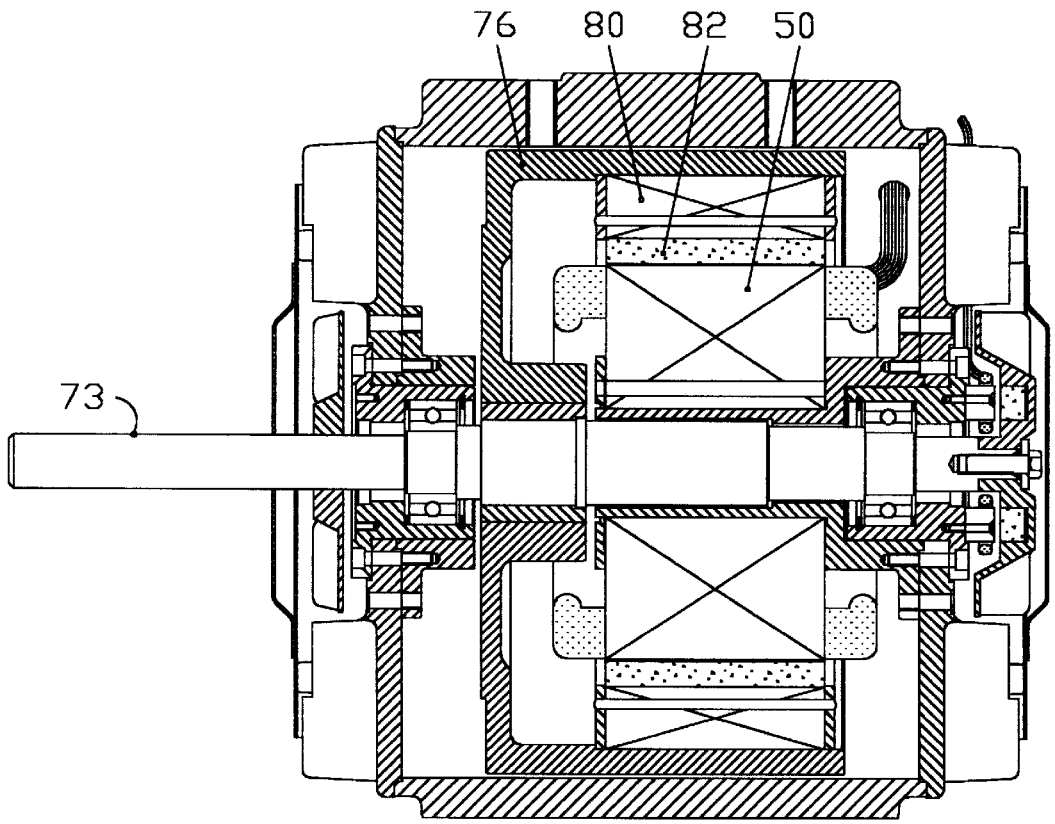
FIG. 9 is a longitudinal vertical cross-section view of a less desirable modification comprising a dynamo-electric machine of the invention constructed with only a single stator-rotor pair.

After studying the construction of the dynamo-electric machine shown in FIG. 2, it will be obvious to those skilled in the art that a machine could be built utilizing only one stator-rotor pair 250 as shown in FIG. 9. This might be applicable where smaller machines of lesser rating were needed however some of the important benefits listed above that are obtainable with the dual stator-rotor construction shown in FIG. 2 would be lost.

We claim:

1. A versatile dynamo-electric machine comprising:

a machine casing having a cylindrical inner bore extending from one end to the other and end bells attached to each end of said casing to form an enclosed housing;

two annular ring shaped independent stators, each stator having one inner end affixed to and supported by the casing end bells for transfer of heat from said stators to said casing, and having an opposite end extending inwardly from said end bells into the cylindrical bore so as to define an axial separation space therebetween, each stator having a central axial aperture extending therethrough;

each stator having an outer cylindrical surface coaxial with said bore axis and having axially disposed slots formed thereon, each stator having a main electrical winding positioned in most of said slots, and at least one core containing at least one pair of adjacent slots with a concentrated winding in the pair of adjacent slots, electrical leads to the concentrated windings connected to a source of single phase AC through its leads, and leads to the main windings configured for connection to at least one of a source of AC power and a load, said main windings being arranged in said core slots to produce a rotating magnetic field when energized by AC current;

a rotor shaft disposed within and coaxially of said bore, first and second bearings for rotatably supporting said rotor shaft, one of said bearings affixed to each of said end bells with at least one end of said shaft extending to the exterior of the casing, said rotor shaft passing through said central axial aperture of said stator cores with a clearance space therebetween;

a circular metal drive plate being affixed to said rotor shaft and extending radially outwardly at said axial separation space between said stators;

two circular cylindrical sleeves formed around the outer periphery of said stators, one sleeve being attached to each side of the periphery of said drive plate and defining a small clearance space between the inner surface of said bore and the outer surface of said sleeves, said sleeves respectively defining two independent electrical rotor elements, one for each of said stators, each of said stators being electrically and magnetically isolated from the other stator by the assembly of the circular metal drive plate, the cylindrical sleeves and said shaft; and a layer of magnetizable permanent magnetic material supported within each of said sleeves and having an exposed innermost cylindrical surface substantially coextensive with and closely spaced to the outer cylindrical surface of each of said stators.

2. The versatile dynamo-electric machine of claim 1 wherein said stators and adjacent rotors are operable as an AC motor when said leads to the main windings are connected to a source of AC power to produce a rotating magnetic field in said stator, the leads to the concentrated windings are connected to a source of single-phase AC of the same frequency as the AC power, and said source of single-phase AC is of sufficient magnitude so as to magnetize said layer of magnetizable permanent magnetic material into alternate and successive north and south magnetic fields.

3. The versatile dynamo-electric machine of claim 2 wherein said magnetic poles react with said rotating magnetic fields in said adjacent stator to cause said motor to rapidly reach and maintain synchronous speed from speeds below the synchronous speed of rotation.

4. The versatile dynamo-electric machine of claim 1 wherein said stators and adjacent rotors are operable as an AC generator when the leads to the concentrated windings are connected to a source of single-phase AC of the same frequency as desired for a load, and said source of single-phase AC is of sufficient magnitude so as to magnetize said layer of magnetizable permanent magnetic material into alternate and successive north and south magnetic fields.

5. The versatile dynamo-electric machine of claim 4, wherein rotation of said rotor produces an AC potential in the main electrical windings in the stator which is the same frequency as in the excitation windings, and the AC potential will be conveyed to the leads from these main windings to the load.

6. The versatile dynamo-electric machine of claim 1 wherein said stator cores and adjacent rotors are operable as a motor-generator when one stator-rotor pair is operated as an AC motor for driving the rotor of the other stator-rotor pair for operation as an AC generator.

7. The versatile dynamo-electric machine of claim 6 wherein said rotational inertia of the rotor assembly enables the AC generator pair to generate AC of a desired frequency for a prolonged period of time to a load when external AC power to the stator-rotor pair operated as an AC motor is interrupted.

8. The versatile dynamo-electric machine of claim 1 wherein at least one of said stators and its adjacent rotor is configured to function as an AC generator and said slots in each of said stators are axially aligned and said main winding for each of said stators is the same, and the main windings pass through slots of both stator sections.

9. The versatile dynamo-electric machine of claim 8 wherein separate concentrated windings are provided for each of said stators so that distinct AC currents can be concurrently passed through each concentrated winding.

10. The versatile dynamo machine of claim 1 further comprising a DC generator component provided at one end of said rotatable shaft projecting beyond an end wall of the casing.

11. The versatile dynamo machine of claim 10 wherein said DC generator component is comprised of a relatively large circular plate rotatable with the shaft and having affixed to its periphery a circular cylindrical shell of low coercive force magnetic material coaxial with and extending inwardly toward the shaft, a layer of magnetizable permanent magnetic material affixed to the inside wall of the shell, the layer having an exposed circular cylindrical surface coaxial with the shaft, the combined circular plate, the cylindrical shell and the affixed layer of magnetic material forming the rotor of said DC generator.

12. The versatile dynamo machine for claim 11 wherein said DC generator component is further comprised of a stator cooperating magnetically with said rotor of said DC generator, said stator comprised of a smaller diameter circular cylindrical shell firmly attached to the machine casing end wall and projecting toward said shell to a point short of the circular plate, the exterior cylindrical surface for the smaller shell having firmly attached thereto a slotted stator core of cylindrical shape extending nearly to and being substantially coextensive with the layer of magnetizable material on the rotor with a rotational clearance space therebetween, and electrical windings disposed in slots on the outer surface of the stator core so as to produce an AC voltage when the layer of magnetized permanent magnetic material on the rotor revolves about the stator.

13. The versatile dynamo machine according to claim 12 further comprising electrical rectifying elements and electrical filter elements, leads provided from the stator windings to the rectifying and filter elements to enable a rectified direct current to be produced, and electrical leads from the rectifying and filter elements to carry the rectified current to a load.

14. The versatile dynamo machine according to claim 12, further comprising a concentrated winding positioned in the slots in the stator of the DC generator component, said concentrated winding configured for producing a pattern of north and south magnetic poles in the layer of magnetizable magnetic material as it rotates past the concentrated winding.

15. The versatile dynamo machine according to claim 1 further comprising:
a base upon which said machine housing is mounted;
an engine also on said base, the engine having control means to enable starting of said engine and its acceleration to a desired speed;
a power output shaft on said engine connected to said shaft from said motor generator by a clutch;
an electrical sensor control means functioning when a fault occurs in the source of AC power to energize the engine control means and to activate the clutch so that the engine shaft is operatively coupled to the motor-generator shaft.

16. The versatile dynamo machine according to claim 15 wherein rotational energy created when said motor-generator is operating causes said engine to start and rapidly accelerate to full operating speed when said clutch is activated.

17. The versatile dynamo machine according to claim 15 further comprising a relatively low voltage direct current starter motor and an associated gear unit attached to the engine shaft, said low voltage for said starter motor provided by a voltage step down transformer and a rectifier circuit operatively connected to the output of the main windings of said motor when there is an interruption in said source of AC power.

18. The versatile dynamo machine according to claim 15 wherein said sensor electrical control means includes timing means that can be set to a selected time period after a disturbance in the source of AC power before it energizes the engine controls and activates the clutch, whereby the rotational inertia of the rotor can be used to enable AC of the desired voltage and frequency to be delivered continuously and without interruption during this selected time period, while the engine is not started.

19. The versatile dynamo-electric machine of claim 1, wherein both stators and their associated electrical rotors function as dual AC motors when the main windings in each of the stators receive AC from an AC source.

20. The versatile dynamo-electric machine of claim 19, further comprising an electrical circuit connectable to the AC source and to the main windings in each stator, the main windings in each stator producing a rotating magnetic field when so energized with AC power so as to react with the layer of magnetizable magnetic material in the associated rotor to start rotation of the rotor, the electrical circuit including switch means in the portion going to one stator, and means for opening said switch means when the rotor is being started from stand-still.

21. The versatile dynamo-electric machine of claim 20 wherein said switch means is configured so that only a single stator receives AC from the source when the machine is being started so that very low inrush starting current flows into the machine and the rotor accelerates until it reaches over about 75% of its normal full speed whereupon the switch means in the circuit closes and AC power from the source is supplied to the other stator also.

22. The versatile dynamo-electric machine of claim 21, wherein single-phase AC is supplied to the concentrated windings in both stators when the rotor reaches about 85% to 90% of full speed, so that the concentrated windings will magnetize that layer of magnetizable permanent magnetic material in both rotor elements into a pattern of north and south magnetic poles which will strongly react with the rotating magnetic fields in both stators so that the rotor will accelerate rapidly to synchronous speed.

23. The versatile dynamo-electric machine of claim 22, wherein the AC supply to the concentrated windings is disconnected when said rotor reaches synchronous speed.

24. The dynamo-electric machine of claim 1 wherein both pairs of stators and their associated rotors function as AC motors, the main windings of both stators are each wound for application thereto of from 50% to 70% of line voltage from the sources of AC power, and are connected in series, and means are provided for changing the phase of the single-phase AC in the concentrated windings relative to the phase of the single-phase AC going to the concentrated windings in the other stator, whereby to change the back electro-motive-force generated by the series stator windings and hence the input power factor of the motor when operating at full speed.

25. The dynamo-electric machine of claim 1, wherein the first stator is connected to a source of AC power and the second stator is connected to a load.

26. The dynamo-electric machine of claim 25, further comprising a switch interposed in the circuit to the leads to the main windings of the first stator, and means provided for operating the switch quickly after usable AC from the AC power source is lost, to interrupt the circuit from the AC source when it is so malfunctioning, and leads provided from the first stator being connected to an electrical circuit capable of furnishing AC power to the lighting and auxiliary electrical equipment, which may be adjacent to the dynamo-electric machine so that they will keep functioning, concurrently with AC power being continuously supplied to the load by the second stator.

27. The dynamo-electric machine of claim 1 wherein both pairs of stator and their associated rotors are operating as motors, and the main windings of the stators are connected in series.

28. The dynamo-electric machine of claim 27 wherein the concentrated windings on the stators are each in an electrical circuit connected to a means for shifting the phase of the single-phase AC of one concentrated winding relative to the phase of the AC in the second concentrated winding, thereby modifying the input power factor of the dynamo-electric machine.

29. The versatile dynamo-electric machine of claim 1, wherein both stators and their associated electrical rotors function as AC motors when the main windings of each of their stators receive AC from an AC source, each main winding configured to operate on a voltage equal to 60% to 70% of the source voltage when the main windings are connected in series, and further comprising:

an electrical circuit connectable to the AC source and to the main windings in each stator, the main windings when energized with AC producing a rotating magnetic field in each stator which will react with the layer of magnetizable magnetic material in its associated rotor to cause rotation of the rotor, the electrical circuit having means for connecting each of the main windings in one stator in series with the corresponding main windings in the other stator and switch means for connecting these windings to provide a delta connection between the main windings of both stators now in series, whereby to produce a high current flow in the main windings and thereby produce a powerful torque on the rotor and a relatively strong acceleration thereof.

30. The versatile dynamo-electric machine of claim 29 further comprising means in the electrical circuit operable when the rotor speed reaches a predetermined speed to connect the series connected main windings of both stators into a wye connection and when the rotor reaches about 85% to 90% of its synchronous speed to energize the concentrated windings in both stators with single-phase AC of the same frequency as being supplied to the main windings so as to magnetize the layer of magnetizable permanent magnetic material on its associated moving rotor into a pattern of north and south magnetic poles that will strongly react with the rotating magnetic field of the main windings to accelerate the rotor to a synchronous speed.

* * * * *